(12) United States Patent
Kikuchi

(10) Patent No.: US 8,799,528 B2
(45) Date of Patent: Aug. 5, 2014

(54) DATA TRANSFER DEVICE AND DATA TRANSFER METHOD

(75) Inventor: Takeshi Kikuchi, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 123 days.

(21) Appl. No.: 13/408,554

(22) Filed: Feb. 29, 2012

(65) Prior Publication Data

US 2013/0007308 A1 Jan. 3, 2013

(30) Foreign Application Priority Data

Jun. 30, 2011 (JP) .................. 2011-146616

(51) Int. Cl.
*G06F 3/00* (2006.01)
*G06F 13/00* (2006.01)

(52) U.S. Cl.
USPC .................. 710/19; 710/29; 710/33; 710/35

(58) Field of Classification Search
None
See application file for complete search history.

(56) References Cited

U.S. PATENT DOCUMENTS

| | | | |
|---|---|---|---|
| 6,445,418 B1* | 9/2002 | Oh et al. | 375/240.01 |
| 7,370,094 B2* | 5/2008 | Rousseau et al. | 709/220 |
| 2004/0186983 A1* | 9/2004 | Wang et al. | 712/218 |
| 2005/0073952 A1* | 4/2005 | Champlin et al. | 370/229 |
| 2006/0056518 A1* | 3/2006 | Conklin | 375/240.24 |

FOREIGN PATENT DOCUMENTS

| | | |
|---|---|---|
| JP | 04-004452 | 1/1992 |
| JP | 10-334039 | 12/1998 |
| JP | 2000-330929 | 11/2000 |

* cited by examiner

*Primary Examiner* — Kris Rhu
(74) *Attorney, Agent, or Firm* — Knobbe, Martens, Olson & Bear LLP

(57) ABSTRACT

One embodiment provides a data transfer device, including: a register configured to set an upper limit value for a transfer data size; and a transfer size controller configured to compare the upper limit value and the transfer data size sent from an external device, and to reduce the transfer data size when the transfer data size is larger than the upper limit value.

19 Claims, 5 Drawing Sheets

DATA TRANSFER DEVICE AND DATA TRANSFER METHOD

CROSS-REFERENCE TO RELATED APPLICATION(S)

This application claims priority from Japanese Patent Application No. 2011-146616 filed on Jun. 30, 2011, the entire contents of which are incorporated herein by reference.

FIELD

Embodiments described herein relate generally to a data transfer device that includes a Maximum Burst Size read judgment feature, and data transfer method.

BACKGROUND

A variety of innovations have been made regarding data transfer. For example, JP-H04-004452-A teaches a method that monitors the number of device bus accesses by measuring the number of data transfers of the data transfer device that is connected to a shared bus, and prohibits the data transfer device to occupy the bus within a predetermined cycle.

JP-H10-334039-A relates to PCI (Peripheral Component Interconnect). The method disclosed disconnects by the host performing a data transfer to a target connected via a shared bus and measures the target data buffer size. After measuring the data buffer size, the method suppresses disconnection by performing a data transfer length in a range that is smaller than the buffer size to prevent a drop in system throughput.

JP-2000-330929-A also relates to PCI. The method disclosed controls the number of disconnects in an initiator; when the disconnection count reaches a prescribed value, the buffer size between the devices is subtracted to prevent a drop in system throughput.

Incidentally, in order to send and receive frames between an SAS (Serial Attached SCSI) initiator and target, in particular, a connection must be established by an OPEN sequence. A maximum data length (specifically, a maximum burst size) is prescribed between both devices that is allowed in the sending of data with one connection; when the transfer data length reaches the maximum burst size, data transmission is terminated and the connection is closed by the CLOSE sequence.

For example, in cases performing large read transfers from a target device, if the maximum burst size is large, the bus occupancy rate of the target device will also be large, and commands of initiator device may be inhibited. Also, if the maximum burst size is small, the OPEN and CLOSE sequences will occur more frequently thereby increasing the time period required to complete the data sending.

It is preferred that an optimum value is set according to each circumstance because, depending on the circumstances, a transfer using the amount of the maximum burst size can cause a performance decrease.

However, the maximum burst size is actually issued by command from the initiator device, so it is difficult to frequently write data. For that reason, performance suffers because of the problem described above.

BRIEF DESCRIPTION OF DRAWINGS

A general architecture that implements the various features of the present invention will now be described with reference to the drawings. The drawings and the associated descriptions are provided to illustrate embodiments and not to limit the scope of the present invention.

DETAILED DESCRIPTION

One embodiment provides a data transfer device, including: a register configured to set an upper limit value for a transfer data size; and a transfer size controller configured to compare the upper limit value and the transfer data size sent from an external device, and to reduce the transfer data size when the transfer data size is larger than the upper limit value.

An embodiment will now be described with reference to FIGS. 1 to 5.

Figure 1:
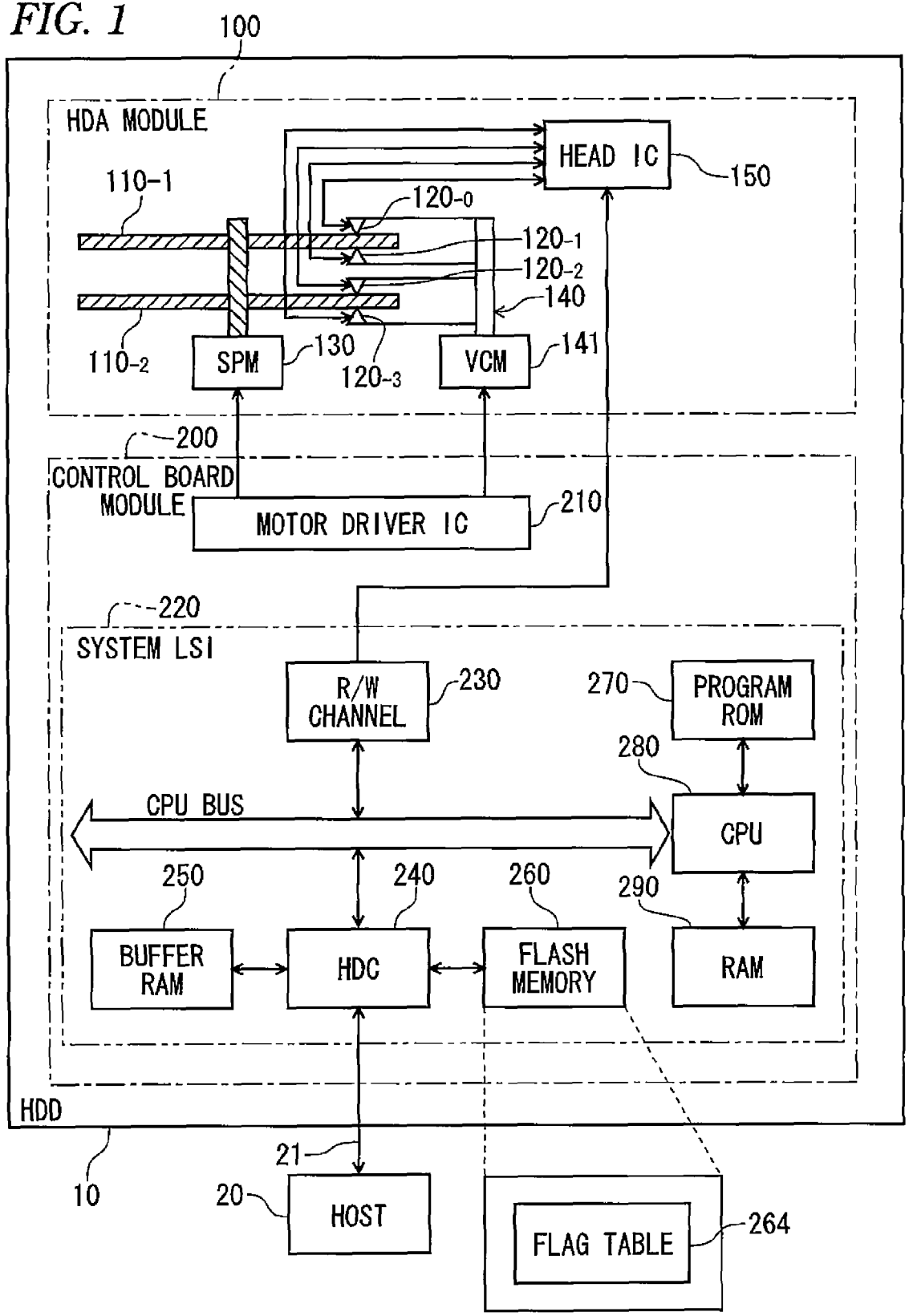
FIG. 1 illustrates a system configuration of an electronic device having a magnetic disc device according to an embodiment.

FIG. 1 illustrates a system configuration of an electronic device having a magnetic disc device according to an embodiment. In FIG. 1, the electronic device includes a magnetic disc device (HDD) 10 and a host (host system) 20. The electronic device is a personal computer, a video camera, a music player, a terminal device, or cellular telephone device, for example. The host 20 uses the HDD 10 as a storage device for the host 20.

The HDD 10 includes a head disc assembly module (HDA module) 100 and a control board module 200. The HDA module 100 includes two discs (magnetic discs) 110-1 and 110-2, for example, a spindle motor (SPM) 130, an actuator 140, and a head IC 150.

Each of the discs 110-1 and 110-2 includes two top and bottom recording surfaces. The discs 110-1 and 110-2 are rotated at high speed by the SPM 130. A known CDR (constant density recording) format is applied to the disc 110-$i$ ($i$=1, 2). For that reason, each recording surface of the disc 110-$i$ is radially separated into plural zones, and is controlled in a unit of zone.

The actuator 140 includes heads (magnetic heads) 120-0 to 120-3. Head arms are provided correspondingly to the recording surfaces of the disc 110-1 and of the disc 110-2, and each of the heads 120-0 to 120-3 is provided on a leading end of the corresponding head arm. The heads 120-0 and 120-1 are used to read and write data to and from disc 110-1 and the heads 120-2 and 120-3 are used to read and write data to and from disc 110-2.

The actuator 140 includes a voice coil motor (VCM) 141 to move the heads 120-0 to 120-3 in a radial direction over the discs 110-1 and 110-2.

SPM 130 and VCM 141 are driven by a drive current (SPM and VCM currents) supplied from a motor driver IC 210, described below.

The head IC 150 amplifies signals (read signals) read by a head 120-$j$ ($j$=0, 1, 2, 3). The head IC 150 outputs to the head 120-$j$ write data transferred from a read/write channel 230 after converting it into a write current.

The control board module 200 includes the motor driver IC 210 and the system LSI 220. Motor driver IC 210 drives SPM 130 at a constant rotating speed. The head driver IC 210 drives the actuator 140 to move by supplying to the VCM 141 current (VCM current) under the control of the CPU 270.

System LSI 220 has a so-called SOC (system on chip) in which a read/write channel (R/W channel) 230, a disc controller (HDC) 240, a buffer RAM 250, a flash memory 260, a program ROM 270, a CPU 280 and RAM 290 are integrated on a single chip.

The R/W channel 230 is a signal processing device that processes signals related to reading and writing data. The R/W channel 230 converts read signals into digital data, and decodes read data from the digital data. The R/W channel 230 also extracts from the digital data, servo data needed to position the head 120-*j*. The R/W channel 230 also encodes write data.

The HDC 240 is connected to a host 20 via a host interface 21. The HDC 240 receives commands (read and write commands and the like) transferred from the host 20. The HDC 240 controls data transfers between the host 20 and the HDC 240. The HDC 240 controls data transfers between the disc 110-*i* (i=1, 2) and the HDC 240, performed via the R/W channel 230.

The buffer RAM 250 temporarily stores data to be written to disc 110-*i* and data read from the disc 110-*i* via the head IC 150 and R/W channel 230.

The flash memory 260 is a rewritable non-volatile memory. The flash memory 260 temporarily stores data of a fractional sector in write commands received from the host, for example.

The program ROM 270 previously loads a control program (firmware program). The control program may be stored in a part of the flash memory 260.

The CPU 280 functions mainly as the controller for the HDD 10. The CPU 280 controls at least a part of the HDD 10 according to the control program stored in the program ROM 270. A part of the RAM 290 is used as the work region for the CPU 280, and the data stored in the flash memory 260 is loaded, at least partially, into this work region when the HDD 10 is powered on.

Figure 2:
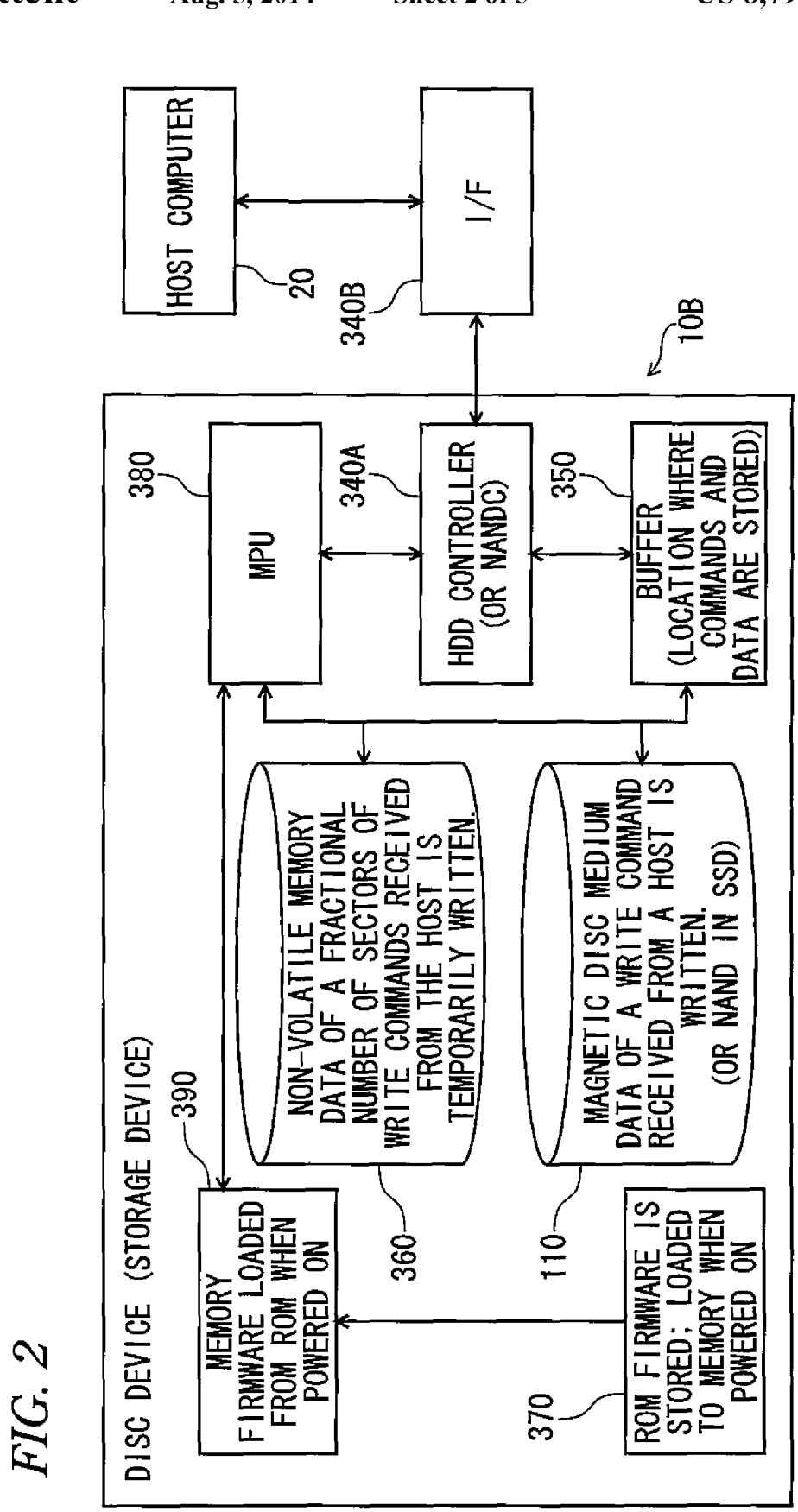
FIG. 2 illustrates a functional configuration of the electronic device according to the embodiment.

FIG. 2 illustrates a functional configuration of the electronic device according to the embodiment. The hardware configuration illustrated in FIGS. 1 and 2 may also be adapted to an SSD (solid state drive) hardware configuration and the like.

As shown in the FIG. 2, the disc device (storage device) 10B includes an MPU 380, an HDD controller 340A and I/F 340B, a buffer 350, a non-volatile memory 360, a magnetic disc medium 110, a memory 390, and a ROM 370. In FIGS. 1 and 2, the MPU 380 corresponds to the CPU 280; the HDD controller 340A and I/F 340B corresponds to the disc controller 240; the buffer 350 corresponds to the buffer RAM 250; the non-volatile memory 360 corresponds to the flash memory 260; the magnetic disc medium 110 corresponds to the discs 110-1 and 110-2; the memory 390 corresponds to the RAM 290, and the ROM 370 corresponds to the program ROM 270.

Embodiment

The embodiment enables to efficiently issue commands from the initiator and to improve the overall system throughput by adjusting data lengths to be transferred for each connection by SAS (serial attached SCSI) based on the target command retention status and initiator status.

In SAS, it is necessary to establish a connection between the initiator and target before transferring data (specifically, the bus is connected and disconnected using OPEN and CLOSE). The maximum data length (maximum burst size) that can be sent and received for each connection is defined. The maximum data length is specified by the initiator. For example, if the size specified for data transmission from the target is large, commands from the initiator are blocked. Conversely, if the maximum data length is small, OPEN and CLOSE are performed frequently, thereby reducing transfer efficiency. In this embodiment, the maximum data length is not changed. Rather, bus efficiency is maximized by acquiring the status of the initiator and the target, and performing conversion internally, thereby effectively increasing in overall system throughput.

Figure 3:
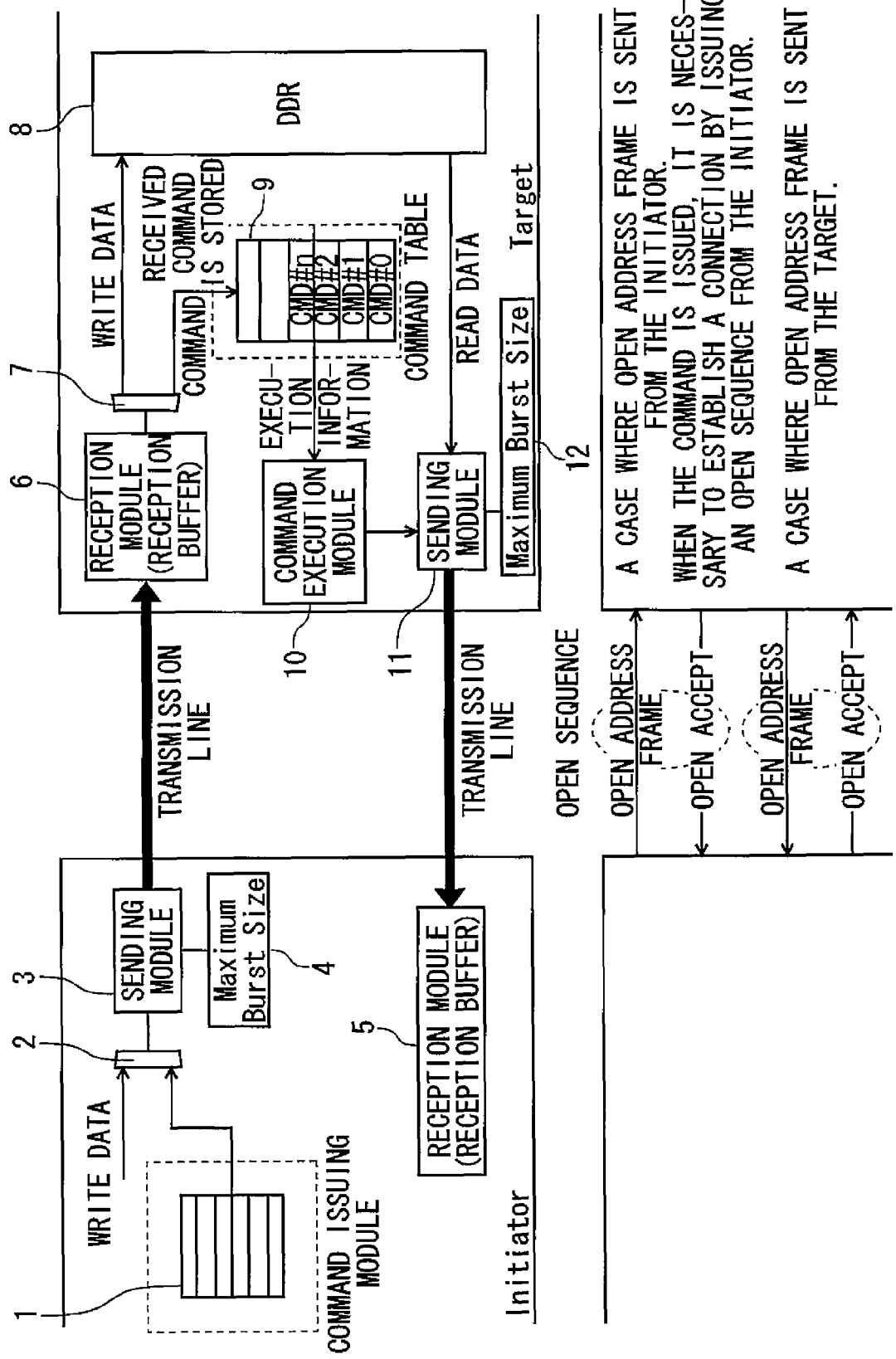
FIG. 3 illustrates data communication between an initiator and a target in the embodiment.

Specifically, with the command table shown in FIG. 3, the number of commands that are retained is adjusted based on the initiator configuration, the transfer speed (1.5 G, 3 G, 6 Gbps) and the status of the connection. For example, when data is being transferred from the target to the initiator, a threshold value is previously acquired, based on the aforementioned status. The maximum burst size is properly converted when the number of commands retained has reached the threshold value, and the CLOSE process is performed. Bus authority is given to the initiator enabling commands to be issued. For the system, command processing can continue efficiently and without delay. Conventionally, the issuing of commands from the initiator was inhibited on specific systems, when the maximum burst size is large.

FIG. 3 illustrates data communication between the initiator and target of this embodiment.

The initiator includes a command issuing module 1, a selector 2, a sending module 3, a maximum burst size setting module 4 and a receiving module 5. The target includes a receiving module 6, a selector 7, a DDR 8, a command table 9, a command issuing module 10, a sending module 11, and a maximum burst size setting module 12. The maximum burst size setting module 12 defines the maximum number of transfers per connection. When the data transfer count reaches this value, the connection is closed.

Regarding the OPEN sequence, it is necessary to establish a connection by sending an OPEN sequence from the initiator when issuing commands to send an OPEN address frame from the initiator. Also, to send an OPEN address frame from the target, the target receives the OPEN ACCEPT.

When a connection is established from the target, there are instances wherein commands cannot be issued from the initiator.

With SAS protocol communication, both devices are connected; if the reception buffer is empty, bidirectional communication is possible. However, when a command is issued, it is necessary to establish a connection by issuing an OPEN sequence from the initiator. Therefore, if the bus is occupied for a long time period by a connection caused by the target, the initiator will be unable to issue the OPEN sequence, which hinders the issuing of the command. As the number of commands held by the target becomes lower, throughput of the entire system may be decreased. According to this embodiment, if the number of commands held by the target is lower than the threshold value, the maximum size is converted to a lower number, and the bus occupied by the target is temporarily freed to prompt the issuing of commands to the initiator.

Figure 4:
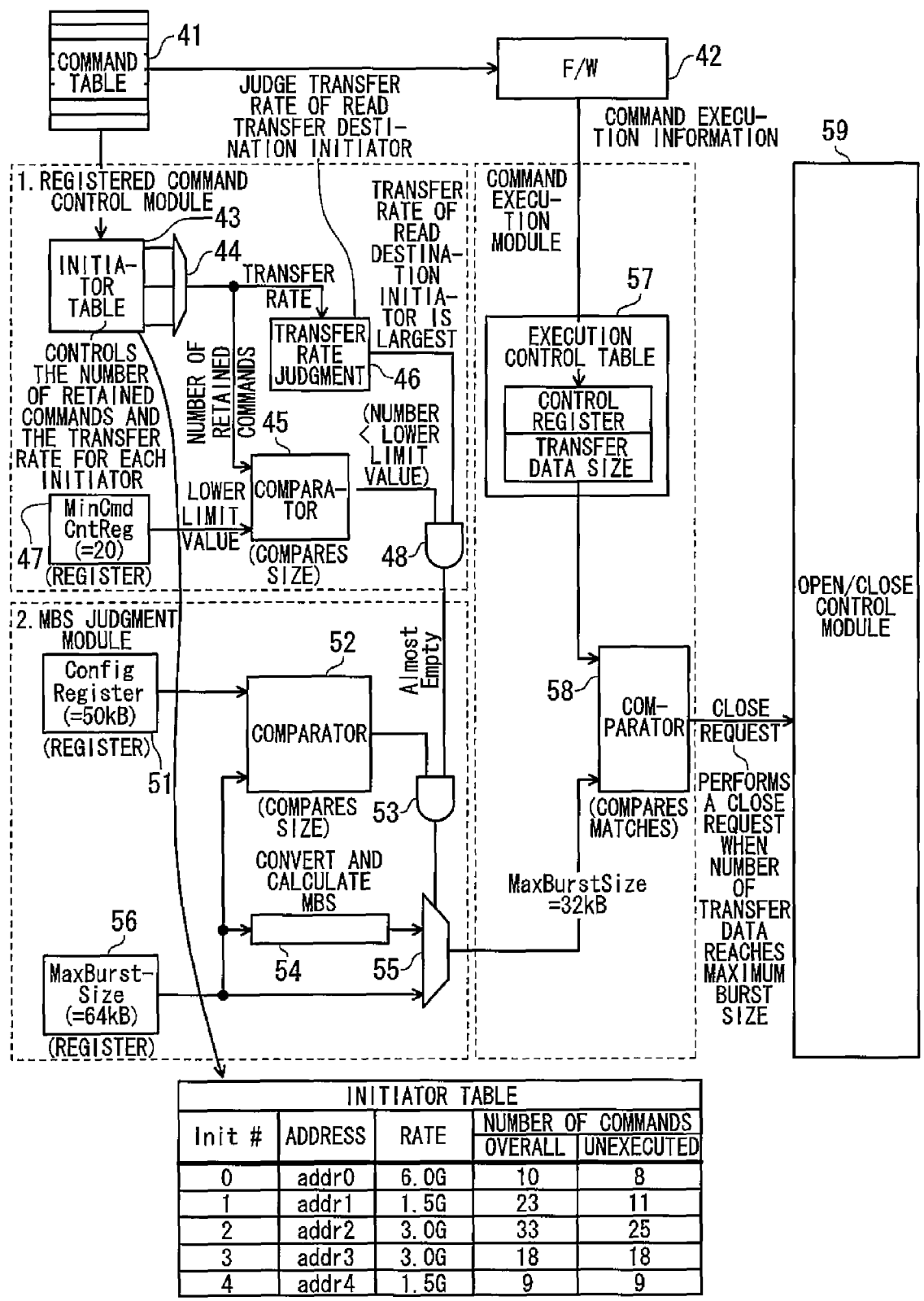
FIG. 4 illustrates a block diagram of the embodiment.

The settings of the functional block diagram of FIG. 4 according to the embodiment will be described.

An example will now be described to execute a read command (40 kB) to initiator #0 with the settings of Config Register 51=50 kB, for a minimum command count register 47=20.

0. Preparation: The firmware performs the following settings when the maximum burst size is received by the initiator. This is executed by HDC 240 for the firmware, but it is also acceptable to be executed by the CPU 280.

0.1: Set the lower limit value for the number of commands held by the target device, in the command control module command count register 47.

0.2: Set the lower limit value for the maximum burst size for conversion, in the MBS judgment module config register 51.

1. Until command startup, the firmware analyzes command table 41 information, registers execution information to the command execution module exchange table 57 and starts up the transfer. Thereafter, the target device enters a state to execute commands.

2. Transfer rate judgment (FIG. 5, described below; judgment 2): The command control module judges transfer rates for each initiator registered in the initiator table 43. In this embodiment, the transfer rate of the initiator #0 is 6.0 G, at most.

3. Judgment of number of commands held (FIG. 5; judgment 3): Command control module compares the number of commands received from the read destination initiator, and the minimum command count register value. In this embodiment, 20 (lower limit value)>10 (number of commands received from the initiator #0); the number of retained commands is fewer than the lower limit value.

The command control module notifies the MBS judgment module of the almost empty flag when it is judged at judgments 2 and 3 that the transfer rate of the read destination initiator is at its highest, and the number of retained commands from this initiator is lower than the lower limit value.

4. Judgment of maximum burst size conversion (FIG. 5; judgment 4): The MBS judgment compares the config register value and the maximum burst size, based on the Almost Empty Flag. Based on this comparison, if the maximum burst size conversion is larger than the config register value, ½ the maximum burst size is notified to the command execution module.

In this embodiment, 50 kB (ConfigReg)<64 kB (MaxBurstSize) so the command execution module is notified of a maximum burst size of 32 kB (64 kB/2).

The command execution module uses this value as the maximum burst size for the immediate transfer. A comparator performs a CLOSE request when the transfer data length reaches this value.

Figure 5:
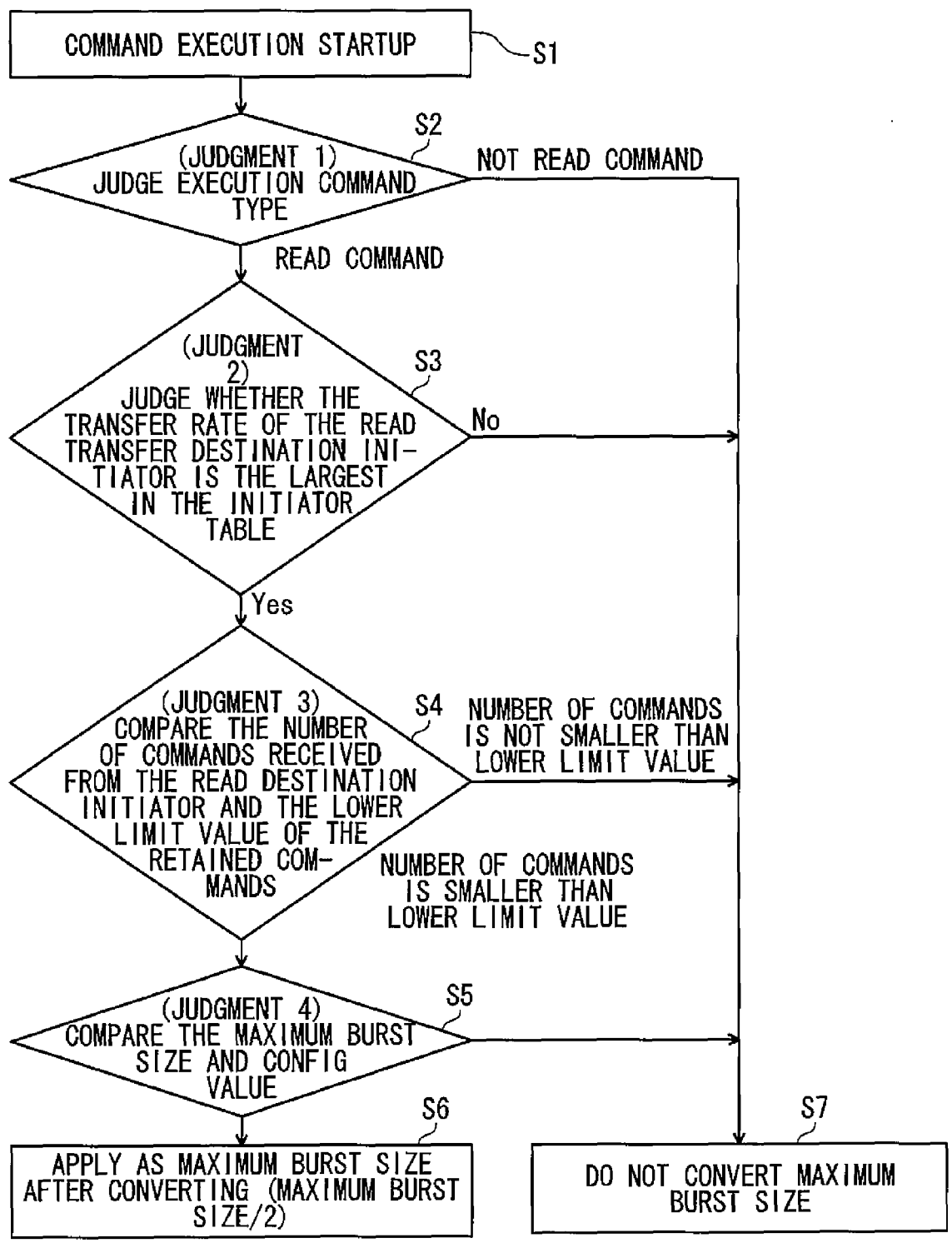
FIG. 5 is a decision-tree flow chart for conversion of a maximum burst size used in the embodiment.

Next, FIG. 5 is a decision tree flow chart for conversion of a maximum burst size based on firmware used in this embodiment.

Step S1: Start command execution.

Step S2: Judge the type of executable command (Judgment 1). If a read command has been judged, the system proceeds to Step S3; if the result is different, the system skips to Step S7.

Step S3: Judge whether the transfer rate of the initiator at the read transfer destination is the largest in the initiator table (Judgment 2). If the judgment is Yes, the system proceeds to Step S4; if the result is different, the system skips to Step S7.

Step S4: Compare the number of commands received from the read destination initiator and the lower limit value of the retained commands (Judgment 3). If the comparison shows that the number of commands is lower than the lower limit value, the system proceeds to Step S5; if the comparison is different, the system skips to Step S7.

Step S5: Compare the maximum burst size and Config value (Judgment 4). If the comparison shows that the number of commands is higher than the Config value, the system proceeds to Step S6; if the comparison is different, the system skips to Step S7.

Step S6: Apply as the maximum burst size after converting (Maximum Burst Size/2) and perform process.

Step S7: The maximum burst size is not converted and the ending process is performed.

A technology was described that relate to judging the status of command retention in a data transfer device, and the essential elements of the following.

A. Mechanism for monitoring the status of device command execution to control the total number of commands that are retained. More specifically, it is acceptable for the HDC 240 to control the combination of all commands and the status of execution (flag on if executing, flag off if not executing), as a flag table 264 in the flash memory 260.

B. Further separate the controls performed by A to controls for each initiator.

C. When a command execution starts, compare the number of commands received and held from the data send destination initiator, and the lower limit value of the preset retained commands.

D. Device converts the specified maximum burst size to a small value.

With this embodiment, H/W performs a judgment of the command retention status and transfer rates for each initiator of the device. If the transfer rate between the read destination initiator devices is high, and there is a low number of retained commands from the initiator, the system converts to a smaller maximum burst size and gives this initiator device priority to bus authority. For example, it is possible to relatively increase the number of received commands from an initiator with a high transfer rate, and to improve the overall throughput of the device.

(1) Mechanism that has a register (Config Register) that sets an upper limit value of the maximum burst size from the firmware, and compares the register setting value and device's maximum burst size. If the maximum burst size is larger than the register setting value, the mechanism halves the maximum burst size (FIG. 4; maximum burst size judgment module).

(2) The mechanism has a register (Minimum Command Count Register) that sets a lower limit value of the number of commands that the device retains from the firmware, and compares the number of unexecuted commands of those that have been received from the frame send destination initiator and retained, and the register setting value. If the number of unexecuted commands is lower than the register setting value, the mechanism uses the maximum burst size from which a value was subtracted by (1) as the maximum burst size executed in the immediate command execution when the unexecuted number of commands is lower than the register setting value (FIG. 4; MBS judgment module).

(3) Mechanism monitors the status of device command execution to set flags for all device retained commands to either executed or unexecuted.

(4) Mechanism for referring the address of the command issuing destination initiator for commands classified in (3) as unexecuted to control the number of unexecuted commands for each initiator.

The invention is not to be construed to be limited to the illustrations described and shown herein. It is possible to embody the components in a variety of forms without departing from the spirit of the invention. For example, this is useful when used for the read command as well as the write command.

Also, the plural components disclosed in the embodiment described above to attain a variety of inventions. For example, it is possible to eliminate all or several of the components disclosed in the embodiment. Still further, it is acceptable to combine components of different embodiments.

The invention claimed is:

1. A data transfer device, comprising:
a register configured to set an upper limit value for a transfer data size of data sent from an external device;
a lower limit value register configured to set a lower limit value for a number of commands sent from the external device; and
a transfer size controller configured to compare the upper limit value and the transfer data size, to compare the number of unexecutable commands of the commands and the lower limit value, and to reduce the transfer data size when the transfer data size is larger than the upper limit value or when the number of the unexecutable commands is lower than the lower limit value.

2. The device of claim 1,
wherein the register sets an upper limit value of a maximum burst size from a firmware.

3. The device of claim 1,
wherein the lower limit value register sets a lower limit value of a number of commands that the device retains from a firmware.

4. The device of claim 3,
wherein the lower limit value register compares the lower limit value and the number of unexecuted commands of the commands that have been received from a frame send destination initiator and retained.

5. The device of claim 4,
wherein the lower limit value register uses the maximum burst size which has been halved when the number of unexecuted commands is lower than the lower limit value.

6. The device of claim 1,
wherein the device monitors a command execution status and sets a flag for a retained command as executed or unexecuted.

7. The device of claim 1,
wherein the device monitors a command execution status and sets flags for all retained commands as executed or unexecuted.

8. The device of claim 6,
wherein the device refers to an address of a command issuing destination initiator for the command classified as unexecuted, and to control the number of unexecuted commands for each initiator.

9. The device of claim 7,
wherein the device refers to an address of a command issuing destination initiator for the command classified as unexecuted, and to control the number of unexecuted commands for each initiator.

10. A storage apparatus, comprising:
a storage module configured to store data sent from an external device;
an interface controller configured to receive commands sent from the external device;
a data transfer device, comprising:
a register configured to set an upper limit value for a transfer data size of the data;
a lower limit value register configured to set a lower limit value for a number of the commands; and
a transfer size controller configured to compare the upper limit value and the transfer data size, to compare the number of unexecutable commands of the commands and the lower limit value, and to reduce the transfer data size when the transfer data size is lager than the upper limit value or when the number of the unexecutable commands is lower than the lower limit value.

11. The apparatus of claim 10,
wherein the register sets an upper limit value of a maximum burst size from a firmware.

12. The apparatus of claim 10,
wherein the lower limit value register sets a lower limit value of a number of commands that the data transfer device retains from a firmware.

13. The apparatus of claim 12,
wherein the lower limit value register compares the lower limit value and the number of unexecuted commands of the commands that have been received from a frame send destination initiator and retained.

14. The apparatus of claim 13,
wherein the lower limit value register uses the maximum burst size which has been halved when the number of unexecuted commands is lower than the lower limit value.

15. The apparatus of claim 10,
wherein the data transfer device monitors a command execution status and sets a flag for a retained command as executed or unexecuted.

16. The apparatus of claim 15,
wherein the data transfer device refers to an address of a command issuing destination initiator for the command classified as unexecuted, and to control the number of unexecuted commands for each initiator.

17. A data transfer method, comprising:
setting an upper limit value for a transfer data size of data sent from an external device in a register;
setting a lower limit value for a number of commands sent from the external device in a lower limit value register; and
comparing the upper limit value and the transfer data size, comparing the number of unexecutable commands of the commands and the lower limit value, and reducing the transfer data size when the transfer data size is larger than the upper limit value or when the number of the unexecutable commands is lower than the lower limit value.

18. The method of claim 17, further comprising:
monitoring a command execution status for setting a flag, for a retained command as executed or unexecuted.

19. The method of claim 18, further comprising:
referring to an address of a command issuing destination initiator for the command classified as unexecuted, for controlling the number of unexecuted commands for each initiator.

* * * * *